US012683814B1

(12) United States Patent
Savalle et al.

(10) Patent No.: US 12,683,814 B1
(45) Date of Patent: Jul. 14, 2026

(54) AUTOMATIC DISCOVERY OF RELATIONSHIPS IN API ENTITIES USING LLM-BASED AGENTS

(71) Applicant: Cisco Technology, Inc., San Jose, CA (US)

(72) Inventors: Pierre-André Savalle, Rueil-Malmaison (FR); Jean-Philippe Vasseur, Combloux (FR); Eduard Schornig, Haarlem (NL); Grégoire Magendie, Lamorlaye (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 18/388,246

(22) Filed: Nov. 9, 2023

(51) Int. Cl.
| | |
|---|---|
| *G06F 16/34* | (2025.01) |
| *G06F 8/36* | (2018.01) |
| *G06F 16/9032* | (2019.01) |
| *G06F 40/20* | (2020.01) |
| *H04L 9/40* | (2022.01) |
| *G06N 3/09* | (2023.01) |

(52) U.S. Cl.
CPC .................. *H04L 9/40* (2022.05); *G06F 8/36* (2013.01); *G06F 16/34* (2019.01); *G06F 16/90332* (2019.01); *G06F 40/20* (2020.01); *G06N 3/09* (2023.01); *H04L 63/108* (2013.01)

(58) Field of Classification Search
CPC ... H04L 63/108; H04L 9/40; G06F 16/90332; G06F 16/34; G06N 3/09
See application file for complete search history.

(56) References Cited

U.S. PATENT DOCUMENTS

| | | | |
|---|---|---|---|
| 2017/0257433 A1 | 9/2017 | Rosa et al. | |
| 2018/0024901 A1 | 1/2018 | Tankersley et al. | |
| 2022/0012097 A1 | 1/2022 | Chaudhary et al. | |
| 2023/0088655 A1 | 3/2023 | O'Dell et al. | |
| 2023/0121420 A1* | 4/2023 | Jain ...................... | H04L 63/108 726/4 |
| 2024/0412720 A1* | 12/2024 | Vasylyev .......... | G06F 16/90332 |
| 2025/0148290 A1* | 5/2025 | Vasseur .................... | G06N 3/09 |

FOREIGN PATENT DOCUMENTS

WO     2022240906 A1    11/2022

OTHER PUBLICATIONS

Kam D., "Harnessing the Power of LLM to Enrich API Description and URL Generation", A-Team Chronicles, Jul. 27, 2023, 12 Pages.

* cited by examiner

*Primary Examiner* — Tuan A Vu
(74) *Attorney, Agent, or Firm* — Lee & Hayes, P.C.

(57) ABSTRACT

In one implementation, a device initiates calls to a first application programming interface endpoint using different parameter values, to capture response data regarding that endpoint. The device generates, based on the response data, a response summary for the first application programming interface endpoint. The device identifies a link between a parameter in the response summary and a parameter associated with a second application programming interface endpoint. The device provides an indication of the link between the parameter in the response summary and the parameter associated with the second application programming interface endpoint.

20 Claims, 8 Drawing Sheets

600

605

START

610

INITIATE CALLS TO FIRST API ENDPOINT

615

GENERATE RESPONSE SUMMARY

620

IDENTIFY LINK BETWEEN PARAMETER IN RESPONSE
SUMMARY AND SECOND API ENDPOINT

625

PROVIDE INDICATION OF LINK

630

END

AUTOMATIC DISCOVERY OF RELATIONSHIPS IN API ENTITIES USING LLM-BASED AGENTS

TECHNICAL FIELD

The present disclosure relates generally to the automatic discovery of relationships in application programming interface (API) entities using large language model-based agents.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs.

In order for an LLM-based agent to perform tasks such as network monitoring and troubleshooting, the agent will need to interact with various application programming interfaces (APIs) associated with the network. Typically, network control systems use REST APIs that are organized into many modular endpoints. For example, an API for a network controller may provide separate endpoints to list network devices, to list clients, or get details of those entities.

To gather meaningful information regarding a network, it is often needed to call multiple API endpoints in succession: e.g., a first call to list the devices, then make another call to get the details of a particular one of those devices, then make a third call to list all clients connected to that device. To this end, many APIs are documented using the OpenAPI Specification format, whereby links specify how the parameters or outputs of a certain API endpoint relates to the parameters of other endpoints. However, links are rarely documented properly in API specifications. In addition, most API specifications can be very incomplete, often not documenting responses consistently, if at all.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
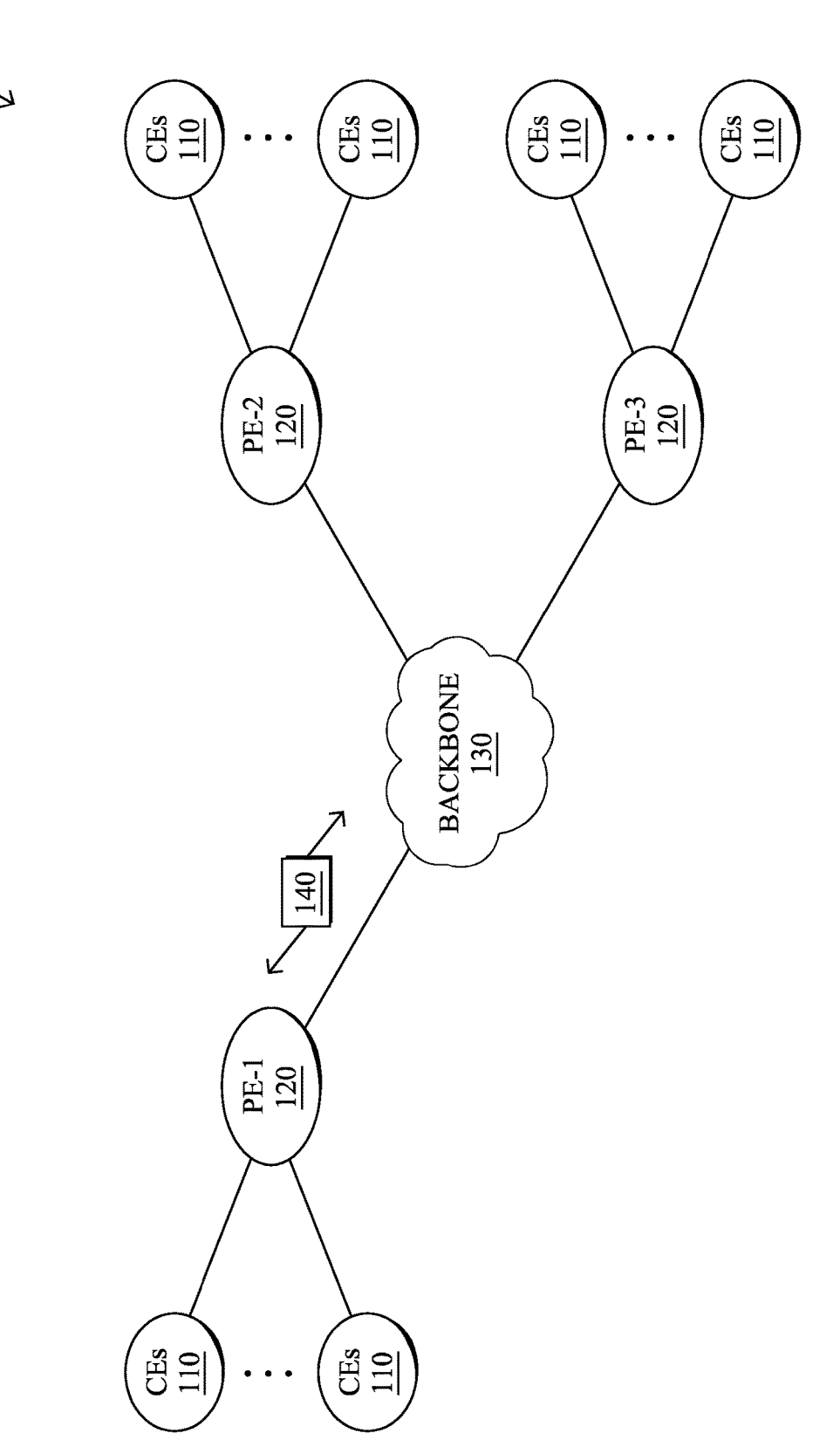
FIGS. 1A-1B illustrate an example communication network.

According to one or more implementations of the disclosure, a device initiates calls to a first application programming interface endpoint using different parameter values, to capture response data regarding that endpoint. The device generates, based on the response data, a response summary for the first application programming interface endpoint. The device identifies a link between a parameter in the response summary and a parameter associated with a second application programming interface endpoint. The device provides an indication of the link between the parameter in the response summary and the parameter associated with the second application programming interface endpoint.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
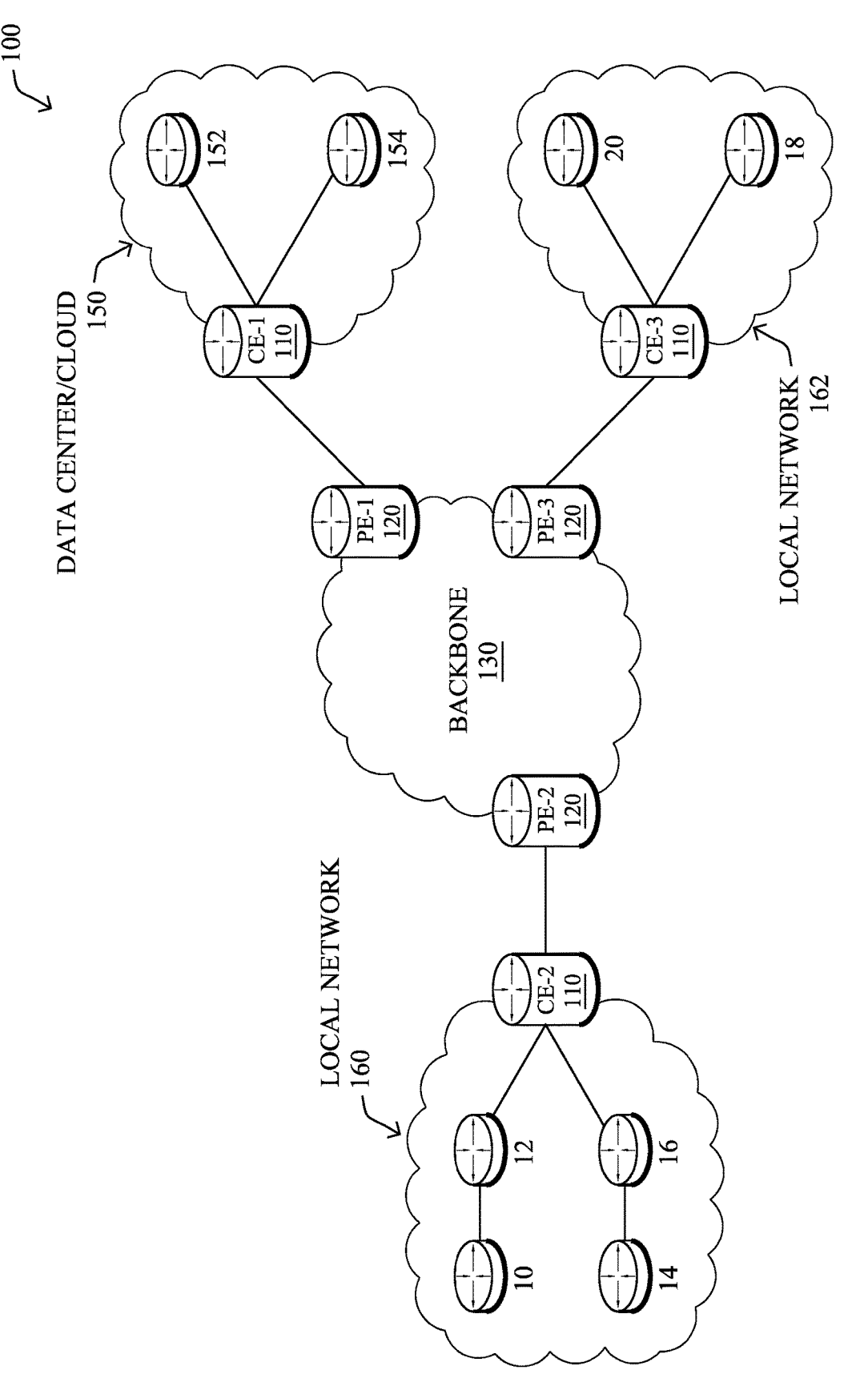

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
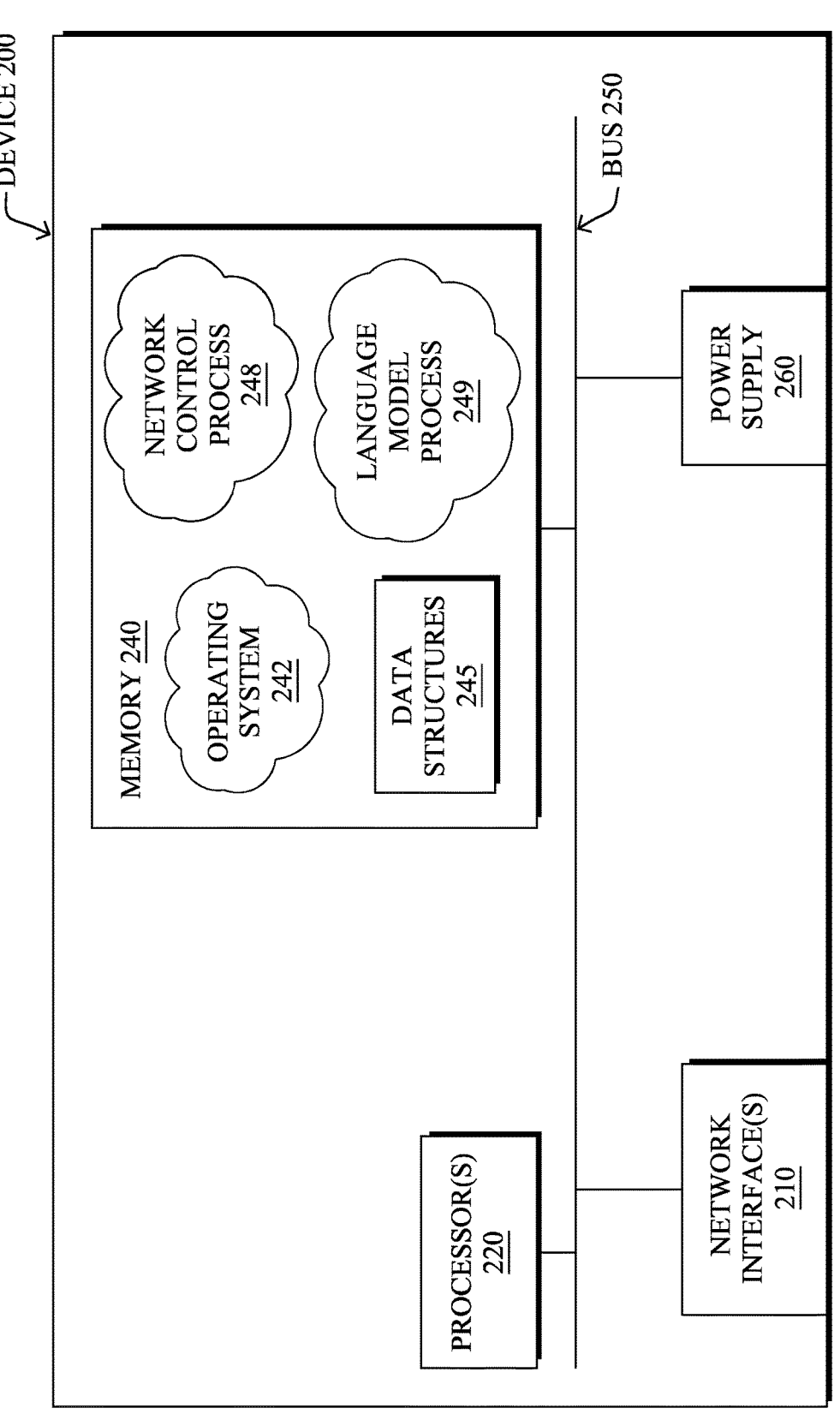
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
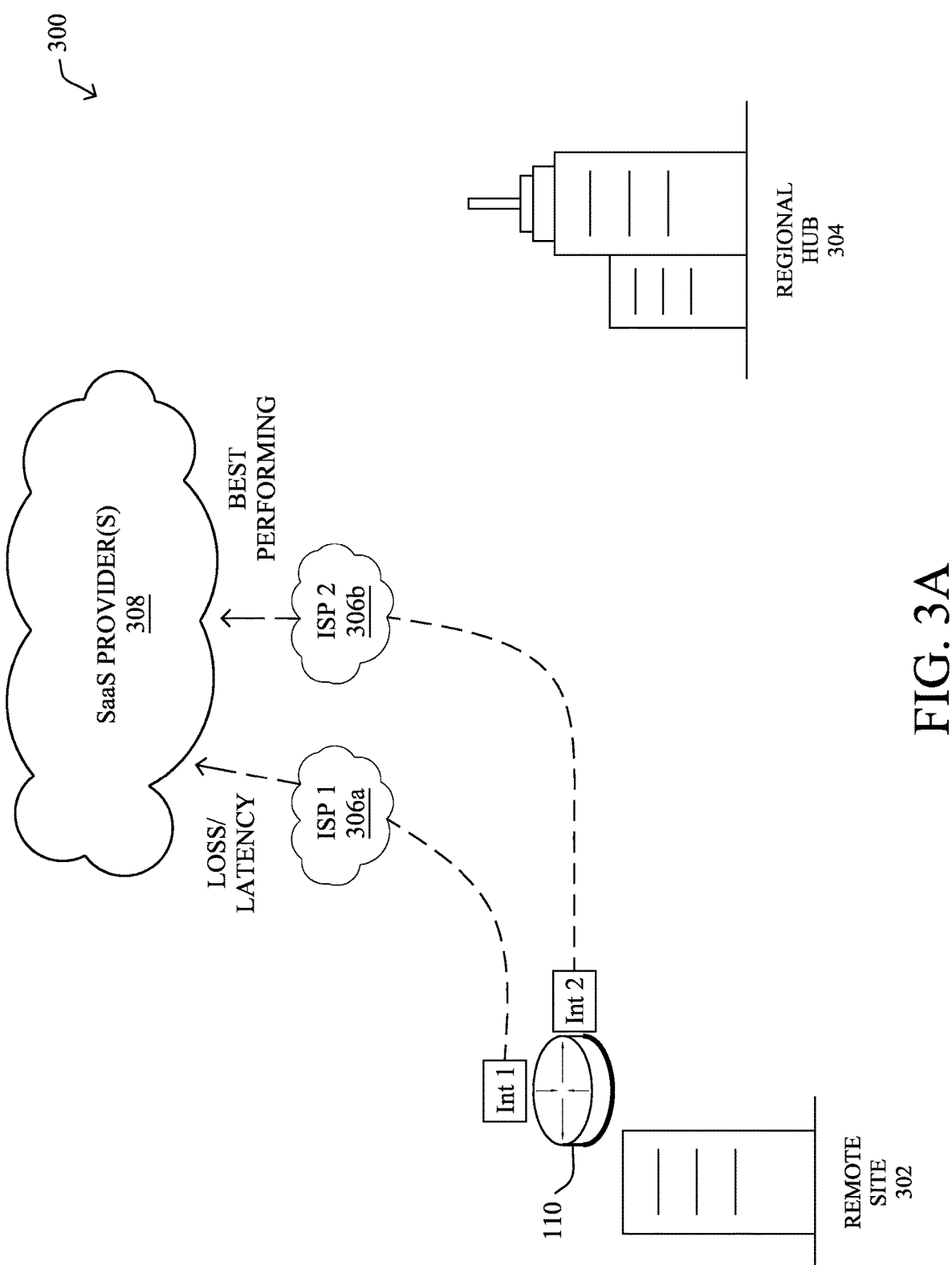
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
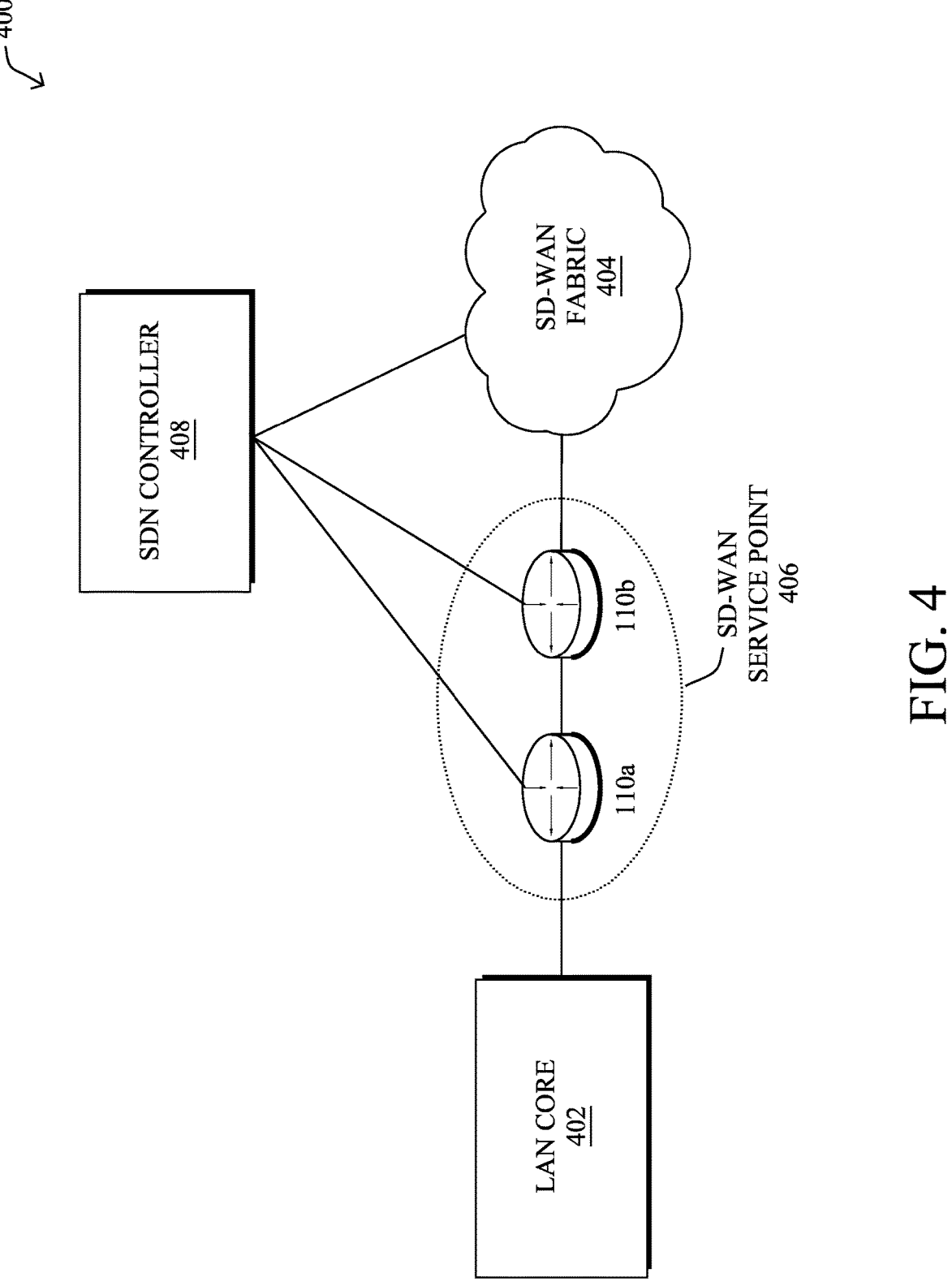
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/ tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end. SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn. SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

Indeed, (REST) APIs are a powerful tool to access information from various systems (e.g., network controllers, security systems, etc.), and most systems provide such an interface. Increasingly, REST APIs are documented for end users through specifications such as in the OpenAPI format, which allows for the corresponding documentation to indicate the operations, parameters, and responses of a given API.

Typically, REST APIs are usually organized into many modular endpoints. For example, an API for a network controller (e.g., controller 408) may provide separate endpoints to list network devices, to list clients, or get details of those entities. To gather meaningful information regarding a network, it is often needed to call multiple API endpoints in succession: e.g., a first call to list the devices, then make another call to get the details of a particular one of those devices, then make a third call to list all clients connected to that device.

OpenAPI formatted API documentation can contain links that specify how the parameters or outputs of a certain API endpoint relates to the parameters of other endpoints. For example, the following fragment shows an API endpoint to create a user, indicating that the user ID returned in the response can be used in another API endpoint named getUser:

```
paths:
/users:
   post:
      summary: Creates a user and returns the user ID
      responses:
         '201':
            links:
               GetUserByUserId
                  operationId: getUser
                  parameters:
                     userId: '$response.body#/id'
                  description: >
```

-continued

---

The 'id' value returned in the response can be used as
the 'userId' parameter in 'GET/users/{userId}'.

---

In complex, real-world APIs, this information can be essential, especially if parameter names are not always consistent. However, links are rarely documented properly in API specifications. In addition, most API specifications can be very incomplete, often not documenting responses consistently, if at all. This can make it difficult to properly use such APIs for human users, which often resort to manual experimentation with the APIs to figure out what the relationships are (e.g., to determine which columns in a response can be used as identifiers or primary keys to be used in other API calls). APIs without proper response and link specifications are especially difficult to use by automated systems, such as automated troubleshooting agents leveraging AI techniques such as large language models (LLMs), to automatically troubleshoot issues by interacting with systems via APIs.

Automatic Discovery of Relationships in API Entities Using LLM-Based Agents

The techniques herein leverage the free-form test processing capabilities of LLMs to automatically document response schemas, links, and relationships between parameters and fields in responses of API endpoints, to make them easier to discover and use by both human users and automated systems. In some cases, the techniques herein may require that there be at least some basic documentation available for an API with the available endpoints and their corresponding parameter names. Better documentation (e.g., parameter types or sample values, response types or examples) can also be leveraged but is not required. Although REST APIs are the most common in use today, the techniques herein also apply to other types of APIs as well (e.g., gRPC APIs, etc.).

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device initiates calls to a first application programming interface endpoint using different parameter values, to capture response data regarding that endpoint. The device generates, based on the response data, a response summary for the first application programming interface endpoint. The device identifies a link between a parameter in the response summary and a parameter associated with a second application programming interface endpoint. The device provides an indication of the link between the parameter in the response summary and the parameter associated with the second application programming interface endpoint.

Figure 5:
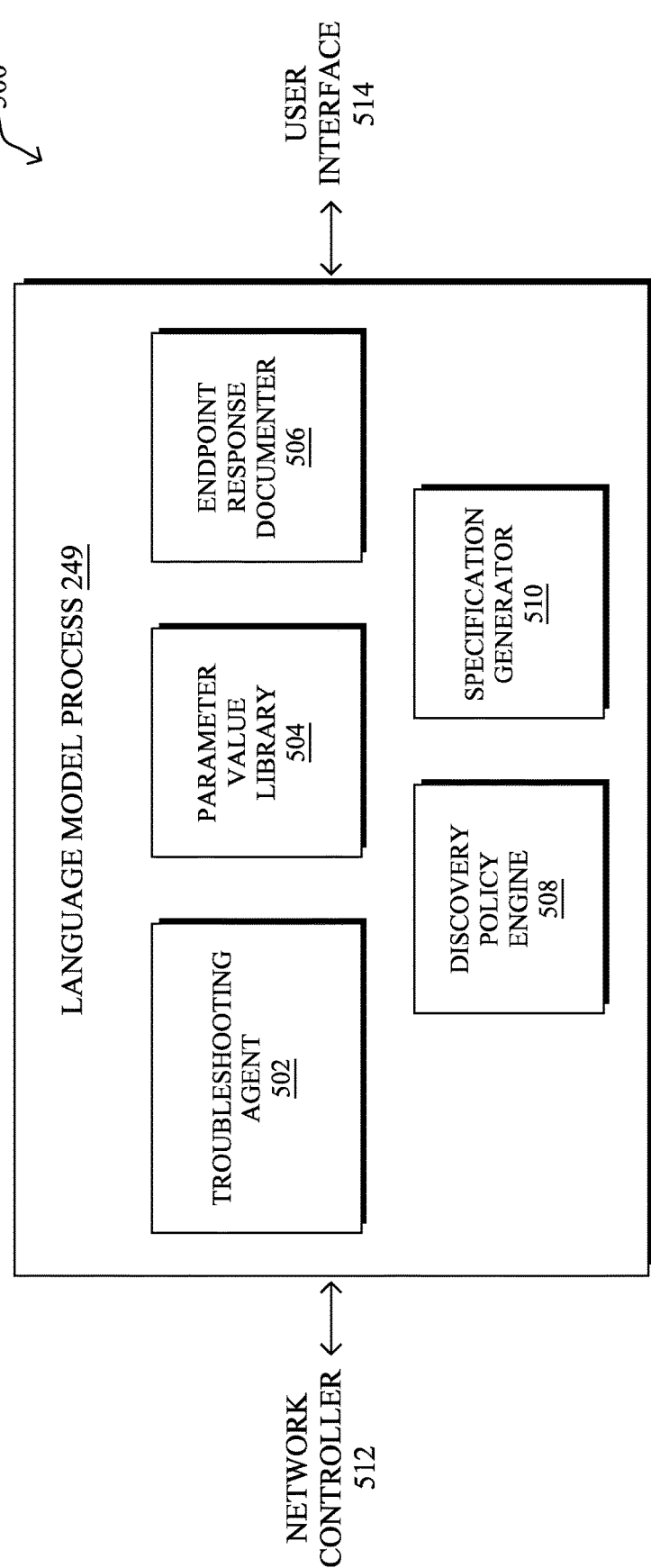
FIG. 5 illustrates an example architecture for the automatic discovery of relationships in application programming interface (API) entities using large language model (LLM)-based agents.

Operationally, FIG. 5 illustrates an example architecture for the automatic discovery of relationships in API entities using LLM-based agents, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 512, either locally or via a network, such as via one or more application programming interfaces (APIs), etc. In addition, language model process 249 may communicate with any number of user interfaces, such as user interface 514.

As shown, language model process 249 may include any or all of the following components: a troubleshooting agent 502, a parameter value library 504, an endpoint response documenter 506, a discovery policy engine 508, and/or a specification generator 510. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,1. Consider the action ak="Check the priority queue length of a router," a static set of action ak,1 may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

Troubleshooting agent 502 retrieves the set of action Ai for the root cause of issue I after activating a timer T (max time to solve the issue)

Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In order to perform its actions, troubleshooting agent 502 may access any number of corresponding APIs, such as for network controller 512 or other relevant system. This requires, though, an understanding of not only the parameter(s) needed for a given API call, if any, as well as the relationships between the API entities. To this end, the other components 504-510 of language model process 249 may operate in conjunction with one another to discover the response schemas, links, and relationships between parameters and fields in responses of API endpoints. As an initial matter, it is assumed that language model process 249 has access to a live API (or set of APIs) with real data, and that concerns such as authentication, authorization, or paging are abstracted away using some form of HTTP client.

In various implementations, parameter value library 504 may take the form of a database that stores sample values for various parameters used throughout an API of interest. For example, the parameter 'user_email' may have the same meaning in all contexts through the API, and parameter value library 504 may store sample values for that parameter in the form of multiple email addresses from real users of the system. The source for the value (i.e., in which response it was originally first seen) is also tracked, such as follows:

user_email: value=john@mail.com source=listUsers
    user_email: value=ringo@mail.com source=listUsers Parameter value library 504 may also contain sub-records for parameter combinations:

device_id: value=SWITCH-12345 source=listDevices
        interface_name:         value=GigabitEthernet1/0/2
            source=listDevices These records indicate that a sample value for device_id is SWITCH-12345, and that for endpoints that require both device_id and interface_name, the combination (SWITCH-12345, GigabitEthernet1/0/2) can be used. However, the sample value for interface_name cannot be used in isolation for other values of device_id, or if there is no device_id parameter to begin with.

Finally, records in parameter value library 504 may also contain context qualifiers, indicating that a given parameter value can only be used in a specific context. Context is provided as free form text fragments. For instance:

device_id:  value=SWITCH-12345  source=listDevices
        ctx={CLI operations}

Parameter value library 504 may be initialized manually (e.g., via user interface 514), if there is any prior knowledge, or can be empty initially. The next components described below will add sample values in the process, regardless.

In various implementations, endpoint response documenter 506 may take a target API endpoint as input and is responsible for summarizing the response of the endpoint in a particular format, such as the OpenAPI format. In one embodiment, endpoint response documenter 506 can directly invoke the endpoint with various relevant parameter combinations. For each invocation, endpoint response documenter 506 uses heuristics to assess whether the call was successful. For example, if an error was returned (e.g., 404 or 400 HTTP error code), the invocation is marked failed, indicating that the input parameters are not admissible for this endpoint.

Endpoint response documenter 506 then merges the outputs from all the successful invocations: e.g., after invoking the API getDeviceDetails with different values of device_id, endpoint response documenter 506 might produce a table such as Table 1 below:

TABLE 1

| name | model | ipAddress | overallHealth |
|------|-------|-----------|---------------|
| DC-BER-10-CSW0 | Cisco Catalyst | 10.3.4.5 | 4 |
| DC-BER-11-CSW0 | Cisco Catalyst | 10.11.11.11 | 5 |
| . . . | . . . | . . . | . . . |

Endpoint response documenter 506 uses parameter combinations by looking up parameter values from parameter value library 504. In turn, endpoint response documenter 506 could use multiple strategies to generate candidate parameter values. In some cases, there might be too many combinations of values in parameter value library 504 and endpoint response documenter 506 may randomly sample a fixed number of combinations of values. Alternatively, endpoint response documenter 506 can keep sampling until a minimum number of successful invocations has been observed.

The table is then summarized into a schema along with sample values and converted to an OpenAPI response specification or another suitable format.

In another embodiment, endpoint response documenter 506 may itself include an agent built on an LLM model. The LLM can be given access to tools such as a code interpreter and a Hypertext Transfer Protocol (HTTP) client, be configured to search parameter value library 504, and/or tasked with writing code that can query the endpoint. A sample prompt for such an LLM is as follows:

"You are an agent designed to produce outstanding API
        documentation. You are given an API endpoint and an
        OpenAPI specification below. You may query the API
        to observe its behavior using the PythonREPL tool.
    Once you know enough of the API endpoint, you must
        produce a DETAILED documentation of the endpoint's
        response in OpenAPI format.
    ALWAYS provide sample values of each response field.
    If the API requires input parameters, you may search the
        parameter values library using the SearchParameter
        Values tool."

The SearchParameterValues tool can use embeddings or similar techniques for approximate search of parameter value library 504, so that the LLM may formulate natural language queries (e.g., "a user email", which might match multiple such parameters seen in the API under different names). The context associated to values can also be used as part of the search.

In various implementations, discovery policy engine 508 may allow for the configuration of constrains on the behavior and operation of endpoint response documenter 506. Depending on the intended application, it may not be necessary for endpoint response documenter 506 to discover the relationships between all the API endpoints but rather only a subset. For example, in the case of troubleshooting agent 502, only details about the APIs related to metrics and statistics may be required while information on how the software upgrade APIs would not add any benefits, or even worse, may confuse the agent. In such cases, explicitly specifying the API branches that should be discovered will reduce the discovery time and optimize the overall process.

In other cases, relationship discovery for APIs that may lead to impactful actions, such as the ones responsible for rebooting a device, resetting protocol sessions, or purging various state tables (MAC, routing, network address translation, etc.) may be scheduled within specific time windows (e.g., outside business hours or during maintenance windows) or the completely forbidden (e.g., blocked).

Finally, discovery policy engine 508 may also enable the ability to restrict the set of devices or systems against which the discovery process can be performed. Indeed, for endpoint response documenter 506 to perform its job effectively, it must run API queries against live systems. Given that some API endpoints may change the state of the system or can cause some increase temporary load (due to the device having to respond to API calls), it may be desirable to have the ability to either restrict the discovery process to only a subset of less critical devices, or reversely, exclude critical devices or part of the overall environment from this process.

In various implementations, specification generator 510 leverages the previous components and proceeds as follows:

Specification generator 510 starts by identifying from the API specification all of the endpoints that can be invoked without any required parameter. For example, for a network controller API (e.g., an API of network controller 512), there may be an API to list devices that does not require any parameter. These endpoints will serve as starting points to the relationship discovery process. In turn, specification generator 510 adds these endpoints to an Endpoint Queue (e.g., a FIFO queue).

Specification generator 510 then pops an endpoint from the Endpoint Queue and invokes endpoint response documenter 506 to generate a specification of the response. For all parameters used by endpoint response documenter 506 from parameter value library 504 during the response summarization process, a link is created between the source of the parameter value and the endpoint. For all fields of the response that are not floating-point numbers, sample values from the specification are added to parameter value library 504, along with context corresponding to the endpoint name or description when available.

When the queue is empty, a new endpoint is identified that has not yet been processed, and for which there are at least one parameter value in parameter value library 504 for each of its input parameter.

Once language model process 249 has identified the links between the API endpoints, the system may provide the API specifications to user interface 514 for review by a user, in some implementations. In further implementations, troubleshooting agent 502 may also consume the API specifications, allowing it to dynamically generate code to make API calls, in order to perform its actions.

Figure 6:
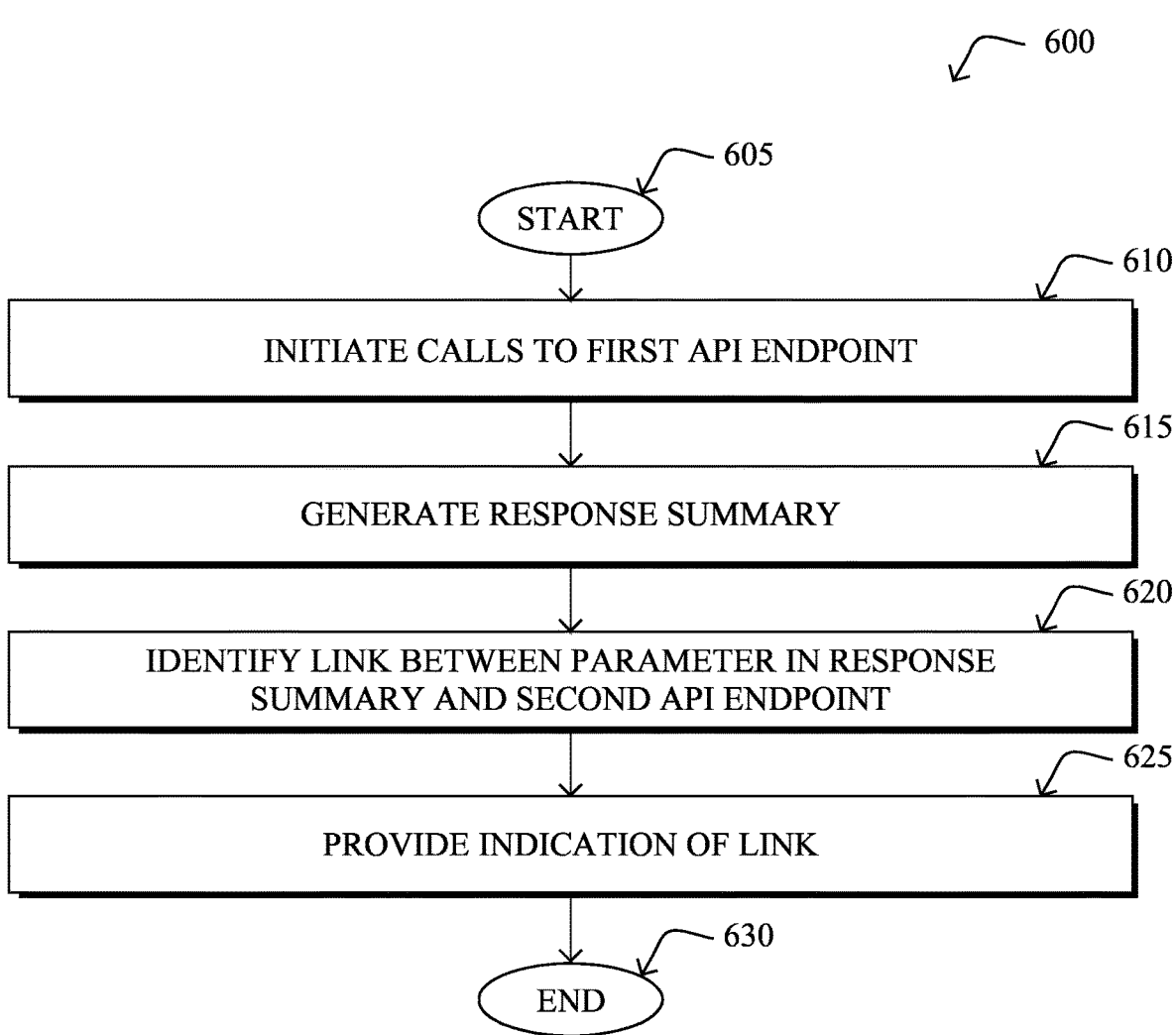
FIG. 6 illustrates an example simplified procedure for the automatic discovery of relationships in API entities using LLM-based agents.

FIG. 6 illustrates an example simplified procedure 600 (e.g., a method) for the automatic discovery of relationships in API entities using LLM-based agents, in accordance with one or more implementations described herein. For example, a non-generic, specifically configured device (e.g., device 200), such as a router, firewall, controller for a network (e.g., an SDN controller or other device in communication therewith), server, or the like, may perform procedure 600 by executing stored instructions (e.g., language model process 249 and/or network control process 248). The procedure 600 may start at step 605, and continues to step 610, where, as described in greater detail above, the device may initiate calls to a first API endpoint using different parameter values, to capture response data regarding that endpoint. In various implementations, the device identifies the link in accordance with a policy that limits which relationships between API endpoints the device is allowed to discover. In some implementations, the device uses a large language model to initiate calls to the first API endpoint. In other implementations, the device selects the different parameter values based on parameter values stored in a database of API parameter values. In one implementation, the device initiates calls to the first API endpoint using different parameter values at a scheduled time according to a defined policy. In another implementation, the device uses a Hypertext Transfer Protocol (HTTP) client to make calls to the first API endpoint.

At step 615, as detailed above, the device may generate, based on the response data, a response summary for the first API endpoint. In one implementation, the response summary is in OpenAPI format.

At step 620, the device may identify a link between a parameter in the response summary and a parameter associated with a second API endpoint, as described in greater detail above. For instance, such a link may indicate a relationship between a parameter returned by the first API endpoint and an input of the second API endpoint.

At step 625, as detailed above, the device may provide an indication of the link between the parameter in the response summary and the parameter associated with the second API endpoint. In some implementations, the device provides the indication to an electronic display for review by a user. In various implementations, the device provides the indication of the link to an LLM-based troubleshooting agent for a network. In turn, the LLM-based troubleshooting agent may the indication to make sequential calls to the first API endpoint and the second API endpoint, to troubleshoot an issue in the network.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for the automatic discovery of relationships in API entities using LLM-based agents, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

performing, by a device, a discovery process to discover one or more application programming interface parameters associated with a first application programming interface endpoint, the discovery process including:

sending calls to the first application programming interface endpoint, the calls including different parameter values; and determining that a first call, from among the calls, was successfully received by the first application programming interface endpoint, the first call including a first parameter;

generating, by the device, a response summary for the first application programming interface endpoint, the response summary including an indication that the first parameter is associated with the first application programming interface endpoint;

identifying, by the device and based on the response summary, a link between the first parameter and a second parameter associated with a second application programming interface endpoint; and providing, by the device, an indication of the link between the first parameter and the second parameter.

2. The method as in claim 1, wherein the device provides the indication of the link to an electronic display for review by a user.

3. The method as in claim 1, wherein the response summary is in OpenAPI format.

4. The method as in claim 1, wherein the device identifies the link in accordance with a policy that limits which relationships between application programming interface endpoints the device is allowed to discover.

5. The method as in claim 1, wherein the device provides the indication of the link to a large language model-based troubleshooting agent for a network.

6. The method as in claim 5, wherein the large language model-based troubleshooting agent uses the indication of the link to make sequential calls to the first application programming interface endpoint and the second application programming interface endpoint, to troubleshoot an issue in the network.

7. The method as in claim 1, wherein the sending includes using a large language model to initiate calls to the first application programming interface endpoint.

8. The method as in claim 1, further comprising:

selecting the different parameter values based on parameter values stored in a database of application programming interface parameter values.

9. The method as in claim 1, wherein the sending includes sending calls to the first application programming interface endpoint using different parameter values at a scheduled time according to a defined policy.

10. The method as in claim 1, wherein the sending includes using an Hypertext Transfer Protocol (HTTP) client to make calls to the first application programming interface endpoint.

11. An apparatus, comprising:

one or more network interfaces;

a processor coupled to the one or more network interfaces; and a memory configured to store one or more instructions that, when executed by the processor, configure the processor to:

initiate calls to a first application programming interface endpoint using different parameter values;

receive response data from the first application programming interface endpoint;

determine, based on the response data, a first parameter that is associated with the first application programming interface endpoint;

generate a response summary for the first application programming interface endpoint, the response summary including an indication that the first parameter is associated with the first application programming interface endpoint;

identify a link between the first parameter and a second parameter associated with a second application programming interface endpoint; and provide an indication of the link between the first parameter associated with the first application programming interface endpoint and the second parameter associated with the second application programming interface endpoint.

12. The apparatus as in claim 11, wherein the apparatus provides the indication of the link to an electronic display for review by a user.

13. The apparatus as in claim 11, wherein the response summary is in OpenAPI format.

14. The apparatus as in claim 11, wherein the apparatus identifies the link in accordance with a policy that limits which relationships between application programming interface endpoints the apparatus is allowed to discover.

15. The apparatus as in claim 11, wherein the apparatus provides the indication of the link to a large language model-based troubleshooting agent for a network.

16. The apparatus as in claim 15, wherein the large language model-based troubleshooting agent uses the indication of the link to make sequential calls to the first application programming interface endpoint and the second application programming interface endpoint, to troubleshoot an issue in the network.

17. The apparatus as in claim 11, wherein the apparatus uses a large language model to initiate calls to the first application programming interface endpoint.

18. The apparatus as in claim 11, wherein the apparatus selects the different parameter values based on parameter values stored in a database of application programming interface parameter values.

19. The apparatus as in claim 11, wherein the apparatus initiates calls to the first application programming interface endpoint using different parameter values at a scheduled time according to a defined policy.

20. A tangible, non-transitory, computer-readable medium storing program instructions that cause a device to execute a process comprising:

initiating, by the device, calls to a first application programming interface endpoint using different parameter values, to capture response data regarding that endpoint;

generating, by the device and based on the response data, a response summary for the first application programming interface endpoint;

identifying, by the device, a link between a parameter in the response summary and a parameter associated with a second application programming interface endpoint; and providing, by the device and to a large language model-based troubleshooting agent for a network, an indication of the link between the parameter in the response summary and the parameter associated with the second application programming interface endpoint.

* * * * *